(12) United States Patent
Loos (10) Patent No.: US 11,473,598 B2
(45) Date of Patent: Oct. 18, 2022

(54) FAILSAFE ELECTRO-HYDRAULIC SERVO VALVE

(71) Applicant: Woodward, Inc., Fort Collins, CO (US)

(72) Inventor: Jordan Loren Loos, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 16/664,571

(22) Filed: Oct. 25, 2019

(65) Prior Publication Data

US 2021/0123458 A1 Apr. 29, 2021

(51) Int. Cl.
| F15B 13/04 | (2006.01) |
| F15B 9/09 | (2006.01) |
| F16K 11/07 | (2006.01) |

(52) U.S. Cl.
CPC ............ *F15B 9/09* (2013.01); *F16K 11/0712* (2013.01); *F15B 2013/0413* (2013.01); *F15B 2211/8752* (2013.01)

(58) Field of Classification Search
CPC ...... F15B 2013/0412; F15B 2013/0413; F15B 13/043; F15B 13/0438; F15B 20/008; F15B 2211/8752
See application file for complete search history.

(56) References Cited

U.S. PATENT DOCUMENTS

| 2,973,013 A | 2/1978 | Myers |
| 4,090,429 A | 5/1978 | Kamimura |
| 4,227,443 A * | 10/1980 | Toot ................... F15B 13/0436 137/625.61 |
| 4,612,844 A | 9/1986 | Byford |
| 4,827,981 A | 5/1989 | Livecchi et al. |
| 5,165,448 A | 11/1992 | Handte |
| 5,220,861 A * | 6/1993 | Kamimura ............ F15B 20/002 91/360 |
| 5,784,884 A | 7/1998 | Poerio et al. |

(Continued)

FOREIGN PATENT DOCUMENTS

| DE | 3813020 | 11/1989 |
| GB | 2181519 | 4/1987 |

OTHER PUBLICATIONS

PCT International Search Report and Written Opinion in International Appln. No. PCT/US2020/056702, dated Feb. 10, 2021, 15 pages.

*Primary Examiner* — Michael Leslie
*Assistant Examiner* — Matthew Wiblin
(74) *Attorney, Agent, or Firm* — Fish & Richardson P.C.

(57) ABSTRACT

The subject matter of this specification can be embodied in, among other things, a fluid valve assembly that includes a first fluid port, a second fluid port, a third fluid port, a valve spool configured to be positioned at a first position, a second position away from the first position, a third position away from the first position opposite the second valve position, the valve spool defining a first fluid duct configured to fluidly connect the first fluid port to the second fluid port in the first valve position, a second fluid duct configured to fluidly connect the first fluid port to the third fluid port in the second valve position, and a third fluid duct configured to fluidly connect the first fluid port to the second fluid port in the third valve position.

3 Claims, 8 Drawing Sheets

(56) References Cited

U.S. PATENT DOCUMENTS

| | | | | |
|---|---|---|---|---|
| 5,899,064 | A | * | 5/1999 | Cheung ................ F15B 20/002 60/406 |
| 6,205,766 | B1 | * | 3/2001 | Dixon ..................... F02C 7/232 60/39.091 |
| 7,243,591 | B2 | | 7/2007 | Sauer et al. |
| 7,475,537 | B2 | | 1/2009 | Spickard |
| 2007/0199314 | A1 | * | 8/2007 | Futa ..................... F15B 20/008 60/399 |
| 2007/0277670 | A1 | * | 12/2007 | Spickard ............ F15B 13/0438 91/392 |
| 2015/0152898 | A1 | * | 6/2015 | Banay ...................... F02C 9/20 60/39.091 |
| 2016/0138724 | A1 | | 5/2016 | Callesen et al. |
| 2017/0058921 | A1 | * | 3/2017 | Dybing ................ F15B 20/005 |
| 2017/0324021 | A1 | * | 11/2017 | Bertrand ............. F15B 13/0436 |
| 2018/0320715 | A1 | | 11/2018 | Haugsjaahabink |

\* cited by examiner

FAILSAFE ELECTRO-HYDRAULIC SERVO VALVE

TECHNICAL FIELD

This instant specification relates to electro-hydraulic servo valves having failsafe features.

BACKGROUND

Electro-hydraulic servo valves (EHSV) are used for electro-hydraulic control of components such as fuel valves, actuators, or switching valves. In some applications, EHSVs can be configured to provide hydraulic power to translate the position of linear or rotary control valves. With position feedback, the EHSV can be configured to drive the position of a control valve.

In previous systems, electrical or hydromechanical failures can drive a second stage of the servo to either end of its respective stroke. Due to the integral nature of the effector, the resulting control pressures can drive an effector in either direction depending on the state of the failure. If the previous device retracts below null, a failure in this direction will retract the effector. Conversely, if the device extends above null, a failure in this direction will extend the effector. Some examples of EHSV failure modes include servo over current, feedback spring failure, nozzle and feed orifice contamination. When blocked, the second stage of an EHSV is driven to one of its physical limits (e.g., hard stops). A null bias can allow for a loss of power scenario that can bias the control pressures of the EHSV such that the effector is moved in a desired direction (e.g., in the case of an actuator, extended or retracted). Therefore, in the case of a zero current failure the control valve will move to a known stop. This only protects against the loss of power scenario.

SUMMARY

In general, this document describes electro-hydraulic servo valves having failsafe features.

In a general embodiment, a fluid valve assembly includes a first fluid port, a second fluid port, a third fluid port, a valve spool configured to be positioned at a first position, a second position away from the first position, a third position away from the first position opposite the second valve position, the valve spool defining a first fluid duct configured to fluidly connect the first fluid port to the second fluid port in the first valve position, a second fluid duct configured to fluidly connect the first fluid port to the third fluid port in the second valve position, and a third fluid duct configured to fluidly connect the first fluid port to the second fluid port in the third valve position.

Various embodiments can include some, all, or none of the following features. The valve spool can be further configured to be positioned at a fourth position in which the valve spool is configured to prevent fluid flow among the first fluid port, the second fluid port, and the third fluid port. The fluid valve assembly can also include an electrohydraulic valve configured to urge the valve spool into at least the first position, the second position, and the third position. The electrohydraulic valve can be configured to position the valve spool into the first position and the second position under nominal operational conditions. The valve spool can be a linear valve spool configured to move linearly, and the first position, the second position, and the third position can be linear positions of the linear valve spool. The second port and the third port can be in fluidic communication with a fluid actuator, and the fluid actuator can be configured to actuate in a first direction based on fluid flow in a first direction through the second port, and actuate in a second direction opposite the first direction based on fluid flow in a first direction through the third port.

In another general aspect, a method of actuating a fluid valve assembly includes actuating a valve spool of a servo valve to a first position, fluidly connecting a first fluid port to a second fluid port based on the first valve position, actuating the valve body to a second position away from the first position, fluidly connecting a third fluid port to the first fluid port based on the second valve position, actuating the valve body to a third position away from the second position opposite the first position, and fluidly connecting the first fluid port to the second fluid port based on the third valve position.

Various implementations can include some, all, or none of the following features. The method can also include actuating the valve spool to a fourth position away from the first position, the second position, and the third position, and preventing, by the valve spool in the fourth position, fluid flow among the first fluid port, the second fluid port, and the third fluid port. Actuating the valve spool to the first position can also include actuating an electrohydraulic valve configured to urge the valve spool to the first position, and actuating the valve spool to the second position can also include actuating the electrohydraulic valve, wherein the electrohydraulic valve is further configured to urge the valve spool to the second position. The electrohydraulic valve can be configured to position the valve spool into the first position and the second position under nominal operational conditions. The servo valve can include a linear valve spool configured to move linearly, and the first position, the second position, and the third position are linear positions of the linear valve spool. The method can also include flowing a first fluid flow through the second port, actuating a fluid actuator in a first direction based the first fluid flow, flowing a second fluid flow through the third port, and actuating the fluid actuator in a second direction, opposite the first direction, based the second fluid flow.

In another general aspect, a fluid actuator apparatus includes a first fluid port, a second fluid port, a third fluid port, a valve spool configured to be positioned at a first position, a second position away from the first position, a third position away from the first position opposite the second position, the valve spool defining a first fluid duct configured to fluidly connect the first fluid port to the second fluid port in the first position, a second fluid duct configured to fluidly connect the first fluid port to the third fluid port in the second position, and a third fluid duct configured to fluidly connect the first fluid port to the second fluid port in the valve position, and a fluid actuator configured to actuate in a first direction based on fluid flow in a first direction through the second port, and actuate in a second direction opposite the first direction based on fluid flow in a first direction through the third port, wherein the second port and the third port are in fluidic communication with a fluid actuator.

Various embodiments can include some, all, or none of the following features. The valve spool can be further configured to be positioned at a fourth position in which the valve spool is configured to prevent fluid flow among the first fluid port, the second fluid port, and the third fluid port. The apparatus can also include an electrohydraulic valve configured to urge the valve spool into at least the first position, the second position, and the third position. The electrohydraulic valve can be configured to position the valve spool into the first position and the second position under nominal operational conditions. The servo valve can include a linear valve spool configured to move linearly, and the first position, the second position, and the third position are linear positions of the linear valve spool. The systems and techniques described here may provide one or more of the following advantages. First, a system can provide failsafe operation of effectors. Second, the system can provide known effector states for system failures of the servo valve. Third, the failure mode states can be selected for application specific requirements (e.g., extend, retract, known flow direction).

The details of one or more implementations are set forth in the accompanying drawings and the description below. Other features and advantages will be apparent from the description and drawings, and from the claims.

DETAILED DESCRIPTION

This document describes failsafe electro-hydraulic servo valve (EHSV) systems. Failures of previous EHSV configurations can drive an effector to either of two physical directions depending on the state of the EHSV at the time of failure, causing a connected effector to be driven either of its physical limits (e.g., fully extended or retracted) depending on the nature of the failure. In general, the EHSVs described in this document are configured to always drive a control valve (and a connected actuator) in the same, predetermined direction regardless of the direction of a failure in the EHSV (e.g., configured to always fail toward extension, or to always fail toward retraction).

Figure 1:
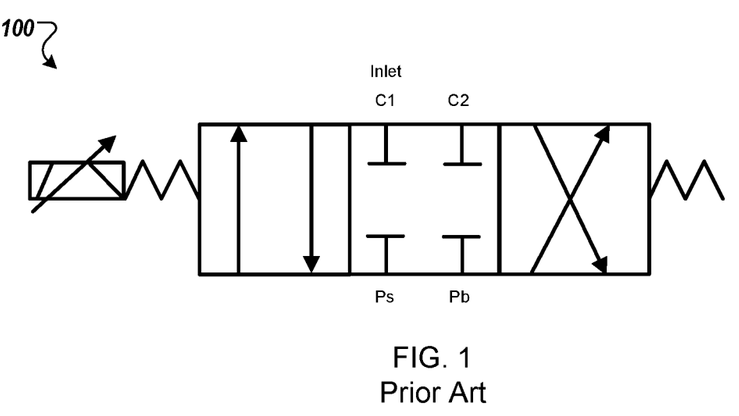
FIG. 1 is a schematic diagram of a prior art four-way servo valve.

FIG. 1 is a schematic diagram of a prior art four-way, three-position servo valve 100. In previous systems, electrical or hydromechanical failures can drive a second stage of the servo to either end of its respective stroke, and the resulting control pressures can drive an effector in either direction depending on the state of the failure. If the valve 100 retracts below null, a failure in this direction will retract the effector. Conversely, if the valve 100 extends above null, a failure in this direction will extend the effector.

Some examples of EHSV failure modes include servo exceeding operational current range, nozzle contamination that biases servo nozzles such that a second stage of a servo is driven to one of its physical limits (e.g., hard stops), and bridge orifice contamination that biases the servo nozzles such that the second stage is driven to one of its internal stops. A null bias can allow for a zero current scenario that can bias the control pressures of the EHSV such that the effector is moved in a desired direction (e.g., the case of an actuator, extended or retracted). Therefore, in the case of a zero current failure the effector will move to a known stop. This only protects against the loss of power scenario.

Figure 2:
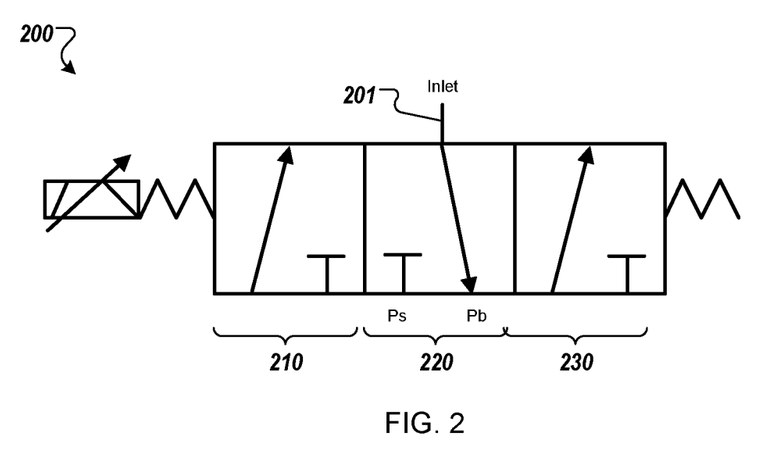
FIG. 2 is a schematic diagram of an example failsafe servo valve.

FIG. 2 is a schematic diagram of an example failsafe servo valve 200. In some instances, it may be desirable to move the effector in a common direction for an EHSV which fails outside of the operational zone. Some examples include, but are not limited to, servo current failing beyond operational current, nozzle contamination biasing the valve in a particular direction and driving a second stage to one of its physical stops, and bridge orifice contamination biasing pressure and driving the second stage to one of its physical stops.

For these examples and others, a traditional servo valve (e.g., the valve 100) will drive the effector to either extend or retract depending on the direction of the failure. If however, it is desirable to always fail to a known stop, additional features can be incorporated to drive the effector in the same direction regardless of the direction of a failure.

In the illustrated example, the valve 200 is a three-way, three-position valve. Under normal operation, the valve 200 moves to modulate an inlet 201 between a first position 210 and a second position 220. In use, the first position 210 can direct fluid from the inlet 201 to a fluid actuator (not shown) to cause the actuator to move in a first direction (e.g., extend), and the second position 220 can direct fluid from the inlet 201 to the fluid actuator to cause the actuator to move in a second direction (e.g., retract). In some examples, normal operation is using the servo device within its rated current and associated valve spool stroke for an allowable rated current. Normal operation can therefore be between positions 210 and 220. Servo performance parameters including control port sizing, rated stroke, and rated current can be sized to operate in conjunction with the actuator. Open loop or closed loop operation can be in these states or positions unless a failure occurs.

Under abnormal operation, the valve 200 may be urged in either direction. In some failure scenarios, the valve 200 may fail toward the position 210 and cause the controlled actuator to move in the first direction during failure (e.g., extend during this failure mode).

The valve 200 also includes a third position 230 beyond the position 220. The third position 230 is configured to direct fluid from the inlet 201 to the fluid actuator to cause the actuator to move in the first direction. In some failure scenarios, the valve 200 may fail toward the position 220. The movement will continue past the position 220 (e.g., retract) to the position 230 and cause the controlled actuator to move in the first direction during failure (e.g., extend during this failure mode). The configuration of the valve 200 will cause a controlled actuator to fail in the same, predetermined direction (e.g., extended or retracted) regardless of the direction in which the valve 200 may be caused to move during a malfunction.

In some embodiments, the example valves can be configured such that the preselected failure direction is the opposite of those in the illustrated example. For example, the valve 200 may exclude the third position 230, and instead have a differently configured third position beyond the first position (e.g., adjacent the left side of the position 210 in the illustrated example) that is configured to direct fluid from the inlet 201 to cause the controlled actuator to move in the second direction. During failure, this configuration of the valve 200 can be driven toward the position 220 during failure, causing actuator retraction during this failure mode, or the valve 200 can be driven across the position 210 to the differently configured third position, also causing actuator retraction during this failure mode.

Figure 3:
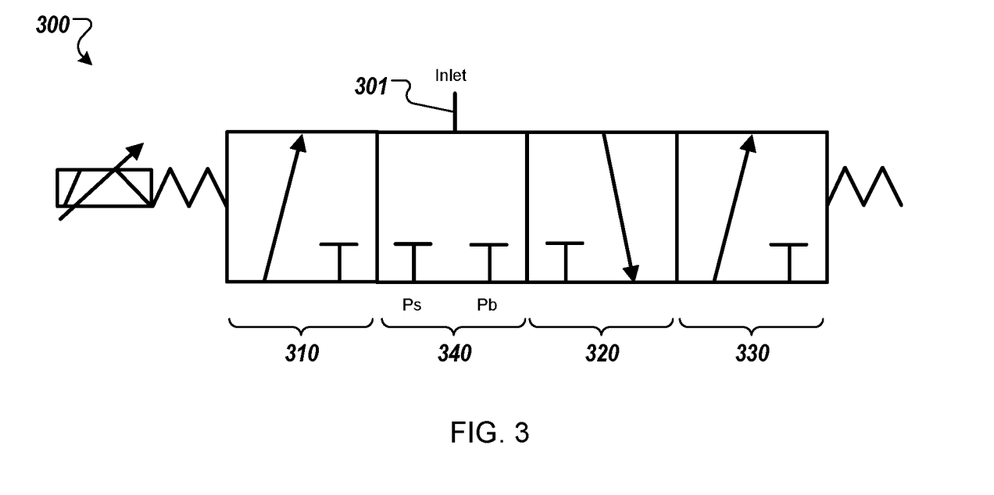
FIG. 3 is a schematic diagram of another example failsafe servo valve.

FIG. 3 is a schematic diagram of another example failsafe servo valve 300. The valve 300 is a three-way, four-position valve. The valve 300 is similar to the example valve 200 of FIG. 2, with the addition of a null position 340 between the first position 310 and the second position 320.

Under normal operation, the valve 300 moves to switch an inlet 301 between the first position 310 (e.g., extend), the second position 320 (e.g., retract), and the null position 340 in which fluid from the inlet 301 is not provided (e.g., blocked) to the actuator.

Under abnormal operation, the valve 300 may be urged in either direction. In some failure scenarios, the valve 300 may fail toward the position 310 and cause the controlled actuator to move in the first direction during failure (e.g., extend during this failure mode). In some other failure scenarios, the valve 300 may fail toward the position 320. The movement will continue past the position 320 (e.g., retract) to the position 330 and cause the controlled actuator to move in the first direction during failure (e.g., extend during this failure mode) without having to first pass back through the null position 340. The configuration of the valve 300 will cause a controlled actuator to fail in the same, predetermined direction (e.g., extended or retracted) regardless of the direction in which the valve 300 may be caused to move during a malfunction.

Figure 4:
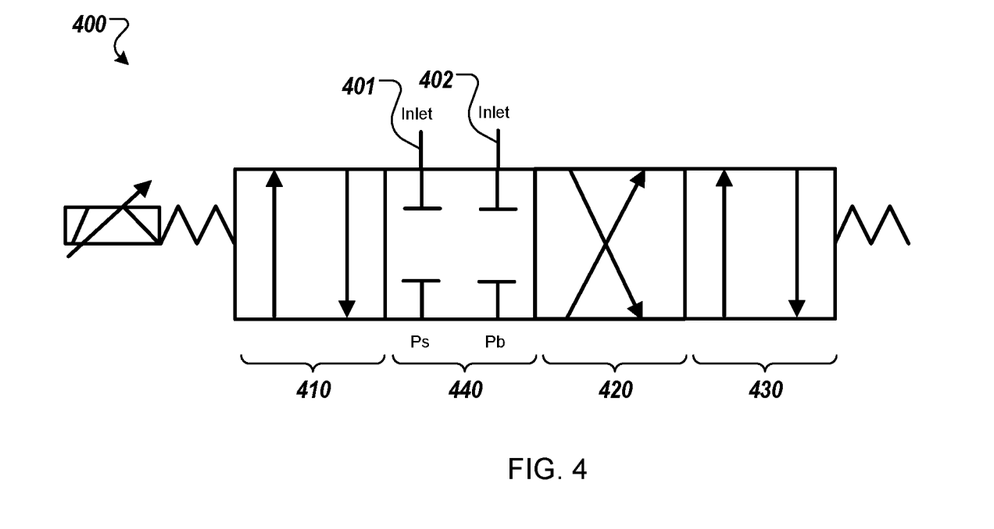
FIG. 4 is a schematic diagram of another example failsafe servo valve.

FIG. 4 is a schematic diagram of another example failsafe servo valve 400. The valve 400 is a four-way, four-position valve. Under normal operation, the valve 400 moves from a null position 440, in which fluid from an inlet 401 and an inlet 402 is not provided (e.g., blocked) to an actuator, to a first position 410 and a second position 420. In use, the first position 410 can direct fluid from the inlets 401-402 through a fluid actuator (not shown) in a first flow direction (e.g., forward) and cause the actuator to move in a first actuation direction (e.g., extend), and the second position 420 can direct fluid from the inlets 401-402 to the fluid actuator in a second flow direction (e.g., reversed) to cause the actuator to move in a second actuation direction (e.g., retract).

Under abnormal operation, the valve 400 may be urged in either direction. In some failure scenarios, the valve 400 may fail toward the position 410 and cause the controlled actuator to move in the first direction during failure (e.g., extend during this failure mode).

The valve 400 also includes a third position 430 beyond the position 420. The third position 430 is configured to direct fluid from the inlets 401-402 in the first flow direction to the fluid actuator to cause the actuator to move in the first actuation direction. In some failure scenarios, the valve 400 may fail toward the position 420. The movement will continue past the position 420 (e.g., retract) to the position 430 and cause flow in the first flow direction and cause the controlled actuator to move in the first actuation direction during failure (e.g., extend during this failure mode). The configuration of the valve 400 will cause a controlled actuator to fail in the same, predetermined direction (e.g., extended or retracted) regardless of the direction in which the valve 400 may be caused to move during a malfunction.

Although the previous examples have been described in terms of extension and retraction, and failsafe failure modes in which the first direction is used as the failsafe direction, other configurations exist. Actuators that are driven by the example valves 200, 300, and 400 can be linear (e.g., extend and retract), rotary (e.g., clockwise and counterclockwise rotation), or any other appropriate fluid effector configuration. In some embodiments, the example valves 200, 300, and 400 can be configured to drive other effectors or outputs, such as fluid jets, pressure supplies, flow supplies, and any other appropriate output that can be controlled by an EHSV. Many of the examples above are described in terms of failing safe in the first (e.g., "extended") configuration, but in some examples the valves 200, 300, and 400 can be modified to fail safe in the second (e.g., retracted) configuration, returning the actuator to a predetermined safe position. In some examples, the safe position can be configured to provide safe engine shutdown, surge protection, engine relight, or any other appropriate operation.

Figure 5:
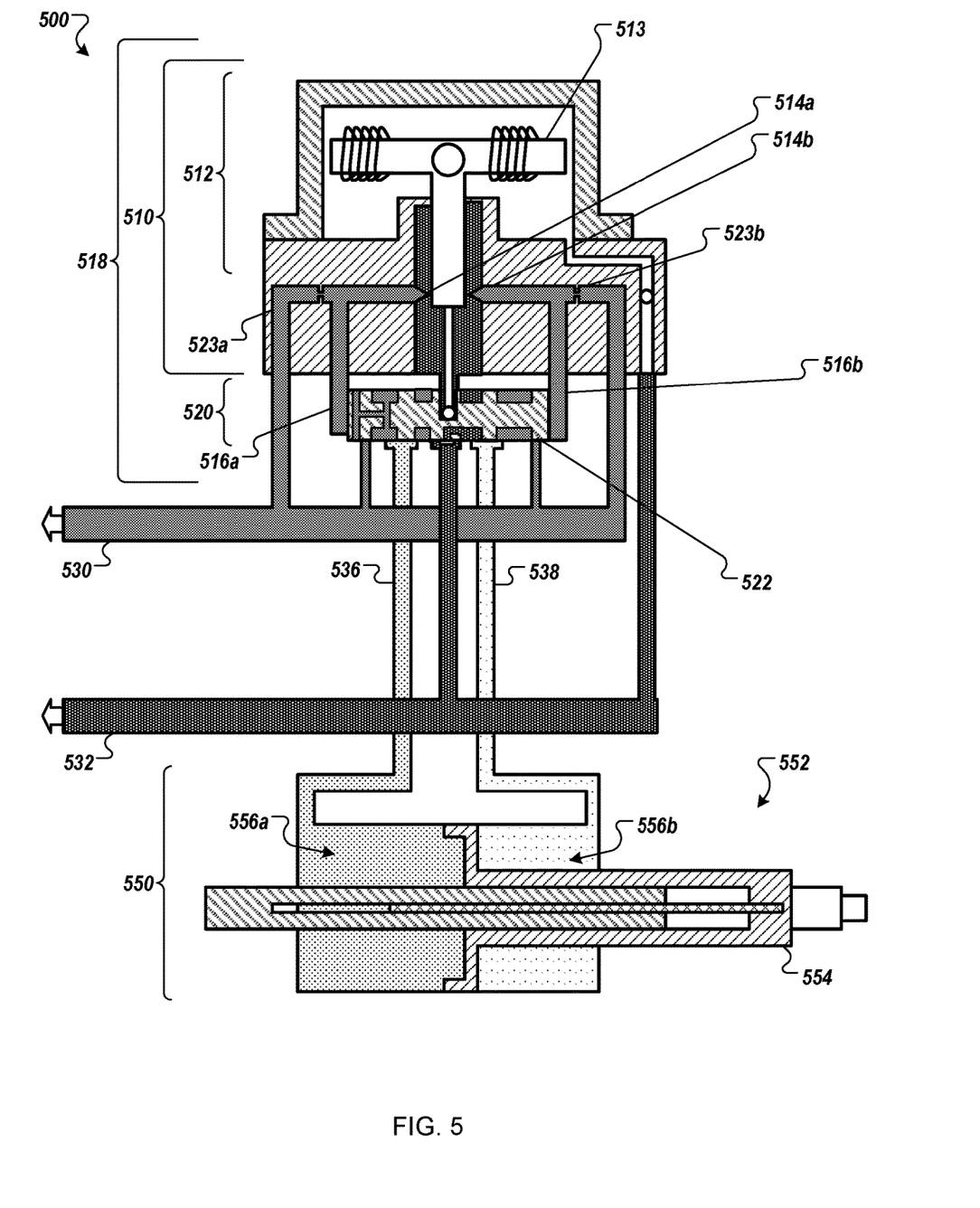
FIG. 5 is a schematic diagram of an example two-stage failsafe electro-hydraulic servo valve controlled actuator.

FIG. 5 is a schematic diagram of an example two-stage failsafe EHSV-controlled actuator 500. The actuator 500 includes a two-stage EHSV 518 and an effector 550.

The first stage 510 includes an electrical actuator 512 (e.g., a torque motor) that is configured to actuate in response to an electrical current and proportionally permit fluid flow through a nozzle 514a and a nozzle 514b, or block fluid flow through the nozzles 514a-514b. The nozzles are in fluid communication with a duct 516a and a duct 516b.

The two-stage EHSV 518 also includes a failsafe piston assembly 520. The piston assembly 520 includes a valve spool 522. In some embodiments, the piston assembly 520 can be configured as any of the example failsafe servo valves 200, 300, or 400 of FIGS. 2-4.

The first stage 510 is configured to receive fluid pressure from a fluid passage 530 through a feed orifice 523a, a feed orifice 523b, nozzles 514a, 514b, and return pressure through a fluid passage 532. When electric currents are provided to the electrical actuator 512, an armature 513 rocks to open the nozzle 514a to the fluid passage 532 and block the nozzle 514b, or open the nozzle 514b to the fluid passage 532 and block the nozzle 514a, depending on how the current is applied.

The fluid passage 530 is in fluid communication with the ducts 516a, 516b. When the nozzle 514a is open and the nozzle 514b is blocked, fluid pressure in the duct 516a drops and pressure in the duct 516b increases. When the nozzle 514a is blocked and the nozzle 514b is open, fluid pressure in the duct 516b drops and pressure in the duct 516a increases. These pressures are applied to opposite ends of the valve spool 522, and the pressure forces urge axial movement of the valve spool 522.

The piston assembly 520 is in fluid communication with a fluid duct 530. The valve spool 522 is also in fluid communication with a fluid duct 536 and a fluid duct 538. The piston assembly 520 is configured to selectively pressurize and depressurize fluid in the fluid ducts 536 and 538 based on the position of the valve spool 522.

The effector 550 of the example two-stage failsafe EHSV-controlled actuator 500 includes a fluid effector 552. The fluid effector 552 includes an effector piston 554 that is actuated based on fluid pressures in a fluid chamber 556a and a fluid chamber 556b arranged opposite the fluid chamber 556a. In the illustrated example, the fluid effector 552 is a linear fluid actuator (e.g., a hydraulic cylinder), but in other examples the fluid effector 552 can be a rotary actuator, or a collection of fluid nozzles, jets, or any other appropriate form of effector.

Generally speaking, electromechanical actuation of the electrical actuator 512 causes mechanical actuation of the piston assembly 520, and actuation of the piston assembly 520 causes actuation of the effector piston 554. Under normal operations, actuation of the electrical actuator 512 in one direction will cause actuation of the effector piston 554 in a first direction (e.g., extension), and actuation of the electrical actuator 512 in the other direction will cause actuation of the effector piston 554 in the opposite direction (e.g., retraction).

Under abnormal operations, the electrical actuator 512 and/or the piston assembly 520 may malfunction. Some failures of the first stage 510 to drive to this scenario could be contamination of the nozzles 514a, 514b that drives the fluid chambers 556a, 556b high and low respectively, contamination of orifices 523a or 523b that drives the fluid chambers 516a, 516b high and low respectively, feedback spring failure, and inadvertent current failure from a control system to the electrical actuator 512 above rated current, driving the second stage 520 beyond its operational stroke.

In these failure scenarios, the control system may lose control of the servo device, meaning the fluid actuator 552 cannot be positioned on command. The design of the two-stage EHSV 518 allows the control pressures 536 and 538 supplied to the effector 550 to reverse polarity and position the effector piston 554 to a desired "safe" position (e.g., that can cause the effector piston 554 to always retract or always extend during such malfunctions).

For example, the piston assembly 520 can be configured with the fluid circuitry of the example failsafe servo valve 400 of FIG. 4. Under normal operation, the electrical actuator 512 can cause operation of the valve 400 among the positions 410, 420, and 440 (e.g., extend, retract, and null). Under abnormal operation, the valve 400 can be positioned to one of two hard stops at the opposite ends of the valve's 400 range of motion. At one end is the position 410, to which the valve 400 may be caused to move under some failure modes. At the opposite end is the position 430 beyond the position 420, and under other failure modes the valve may be caused to move past the position 420 to the position 430. The positions 410 and 430 are configured to provide fluid to the effector 550 in the same configuration (e.g., both configured to cause extension of the effector piston 554, or both configured to cause retraction of the effector piston 554).

Similar embodiments exist for linear or rotary actuation systems. For example, the position 330 of example failsafe servo valve 300 can allow the pressures acting on the effector piston 554 to switch, returning the effector piston 554 to a predetermined safe position. This safe position can be predetermined in order to allow for safe engine shutdown, surge-protection, engine relight, or any other appropriate application of a failsafe configuration or operation. In general, the example failsafe servo valves 200, 300, 400, and the example actuator 500 can be implemented in substantially any system to provide a failure mode in which an actuator or other fluid or mechanical output is configured to be substantially the same as an opposite failure mode. For example, an EHSV can be configured to allow a zero-current failure and second stage hard over failures (e.g., in either direction) to fail the actuator to the same location (e.g., retract during failure, extend during failure, cause low flow during failure, cause high flow during failure, or any other predetermined failsafe configuration).

FIG. 6A-6D are sectional views of an example failsafe valve assembly 600 in various control configurations. The assembly 600 shows an example porting of the piston assembly 520 of the example two-stage EHSV 518 of FIG. 5. The assembly 600 includes a housing 610, a valve spool 620 configured to move linearly within the housing 610, and an effector 630 configured to be actuated by fluids controlled by the spool 620.

Figure 6A:
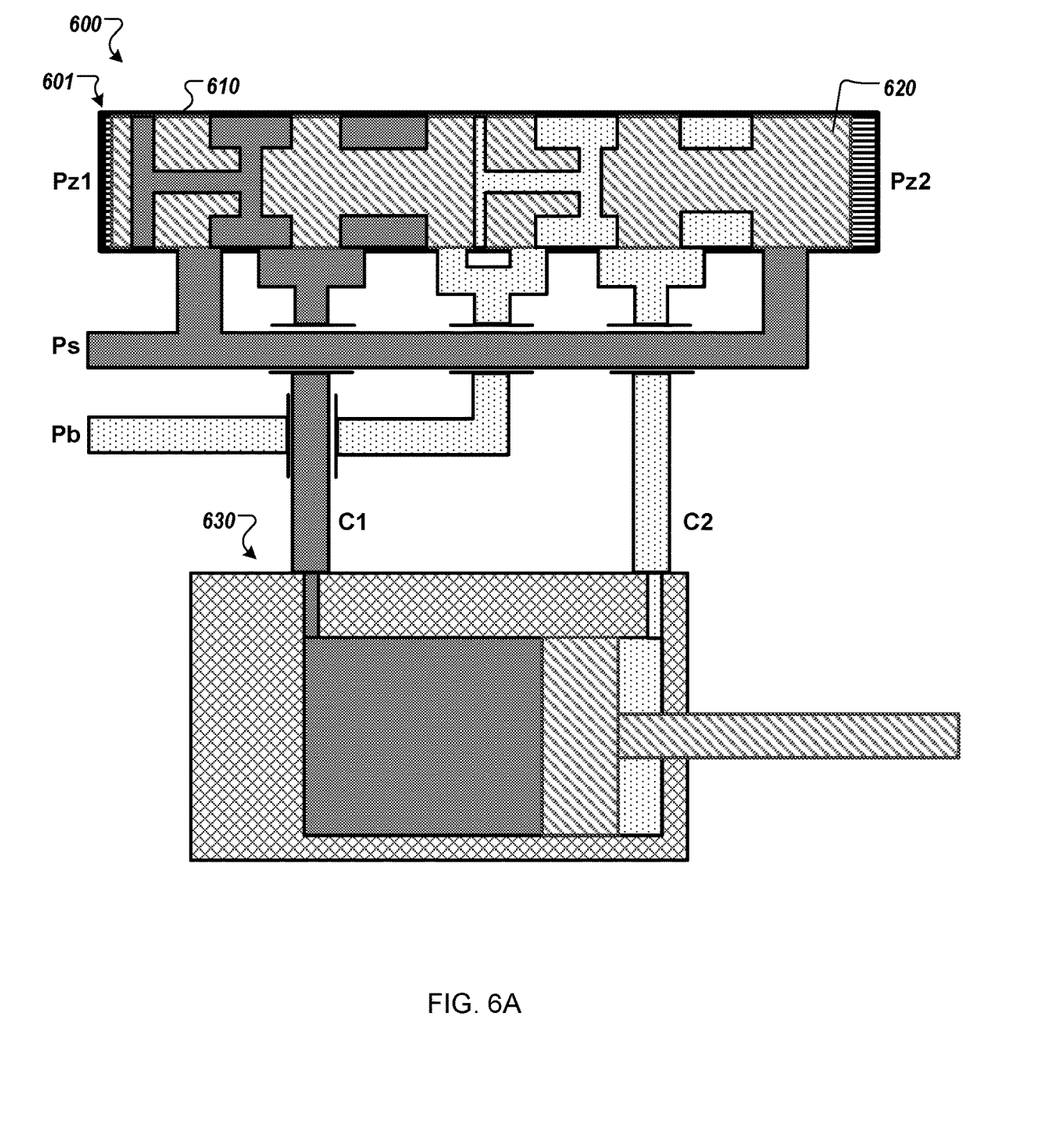
FIG. 6A-6D are sectional views of an example failsafe servo valve in various control configurations.

FIG. 6A shows the assembly 600 in a first example configuration. In the illustrated example, the valve spool 620 is positioned at or near a first end 601 of the housing 610. In some implementations, the first position can cause fluid to flow downstream so as to cause a predetermined action such as one of extension or retraction of the effector 630, one of actuator clockwise or counter-clockwise rotation, one of open or closed flow, or any other appropriate actuation. In some implementations, the configuration shown in FIG. 6A can be a representation of the example valve 400 of FIG. 4, configured in the first position 410.

Figure 6B:
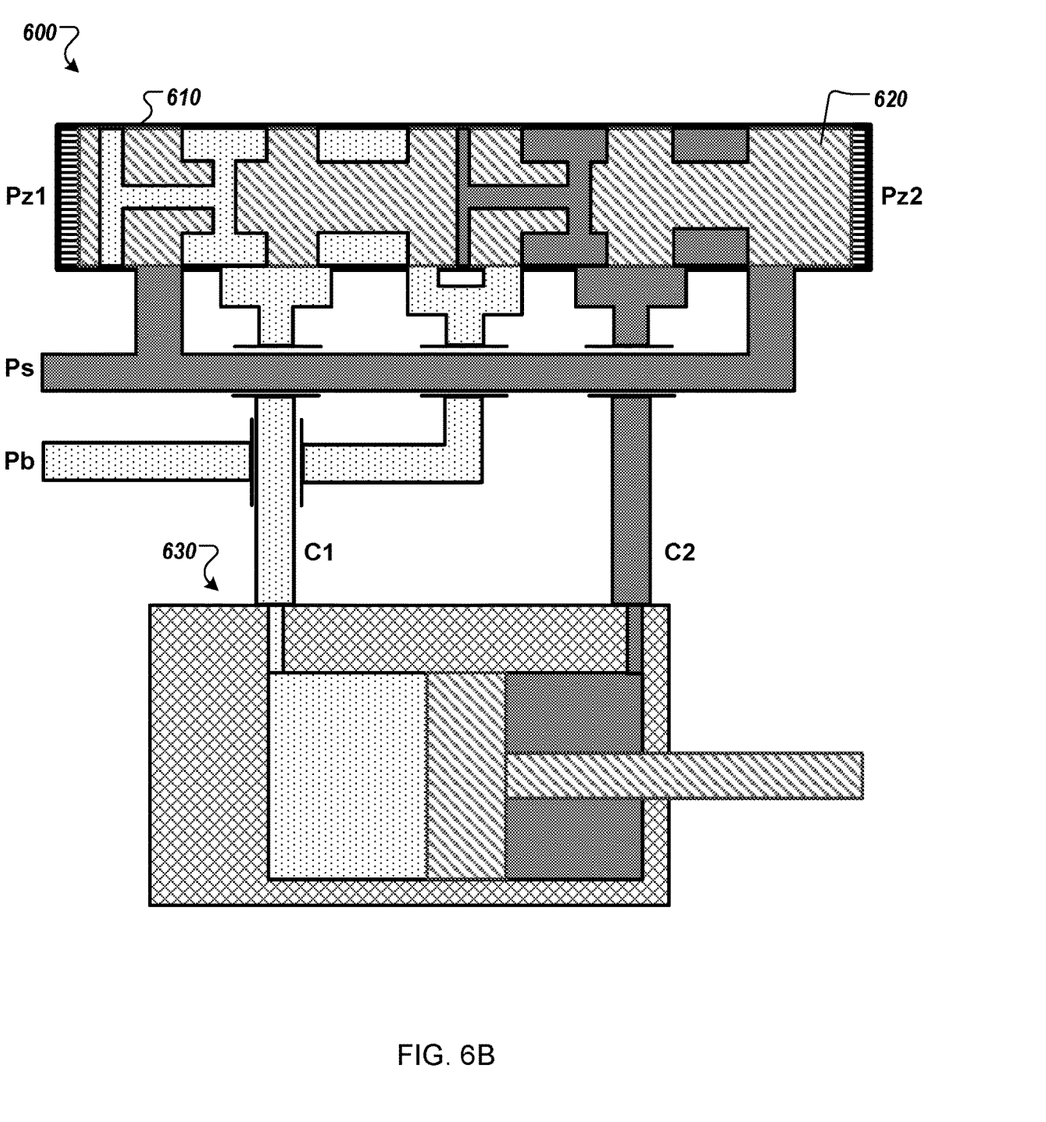

FIG. 6B shows the assembly 600 in a second example configuration. In the illustrated example, the valve spool 620 is positioned within the housing 610 at a second position at or near a null or neutral position (e.g., fluid is not provided downstream). In some implementations, the configuration shown in FIG. 6B can be a representation of the example valve 400 of FIG. 4, configured in the first position 440.

Figure 6C:
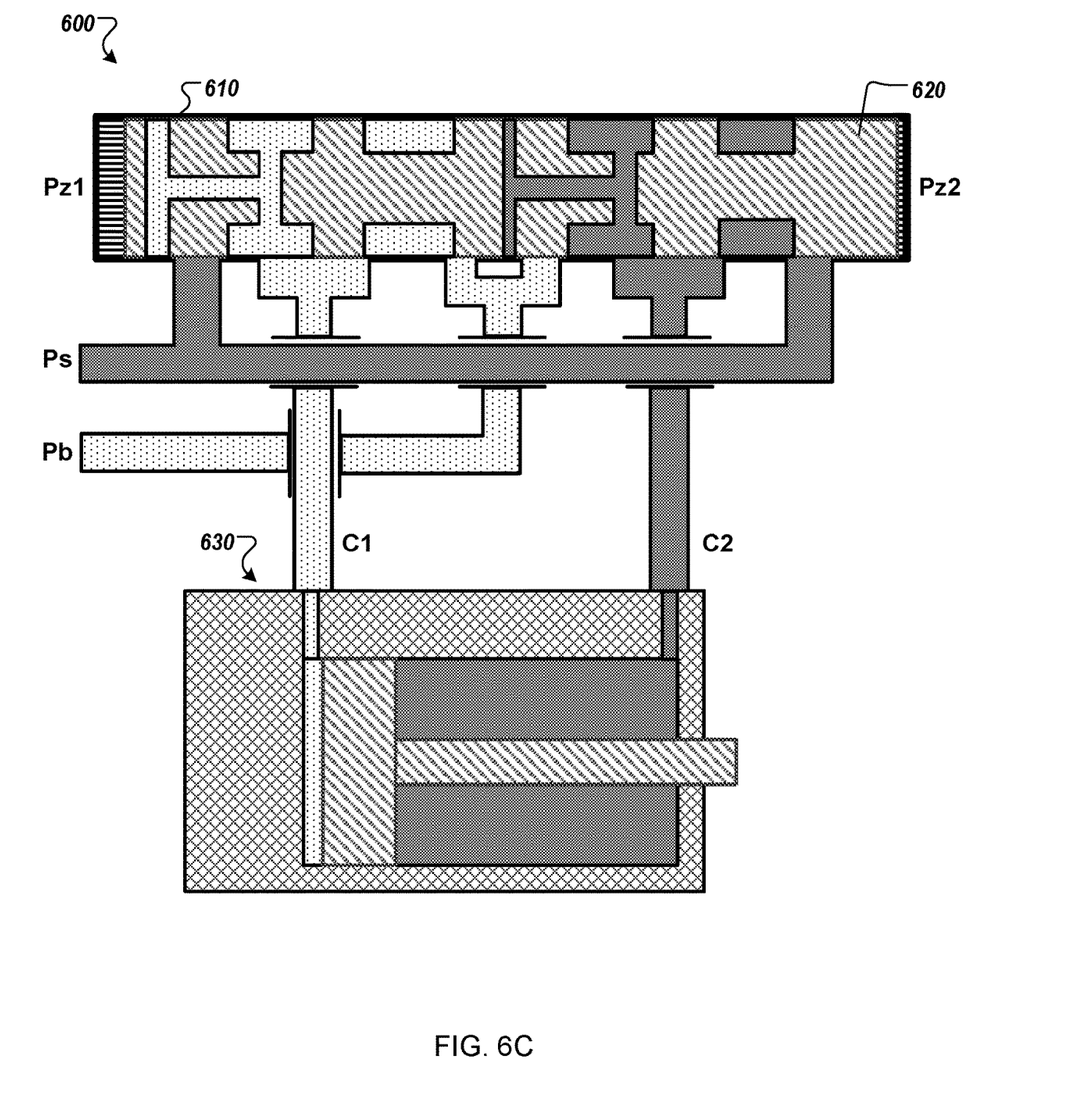

FIG. 6C shows the assembly 600 in a third example configuration. In the illustrated example, the valve spool 620 is positioned within the housing 610 at a third position. In the illustrated example, the effector 630 is fully retracted, and the position of the valve spool 620 causes fluid to flow downstream to the effector 630 so as to cause a predetermined action opposite an action caused by the first position (e.g., in the illustrated example, retraction of the effector 630). In some implementations, the configuration shown in FIG. 6C can be a representation of the example valve 400 of FIG. 4, configured in the second position 420.

Figure 6D:
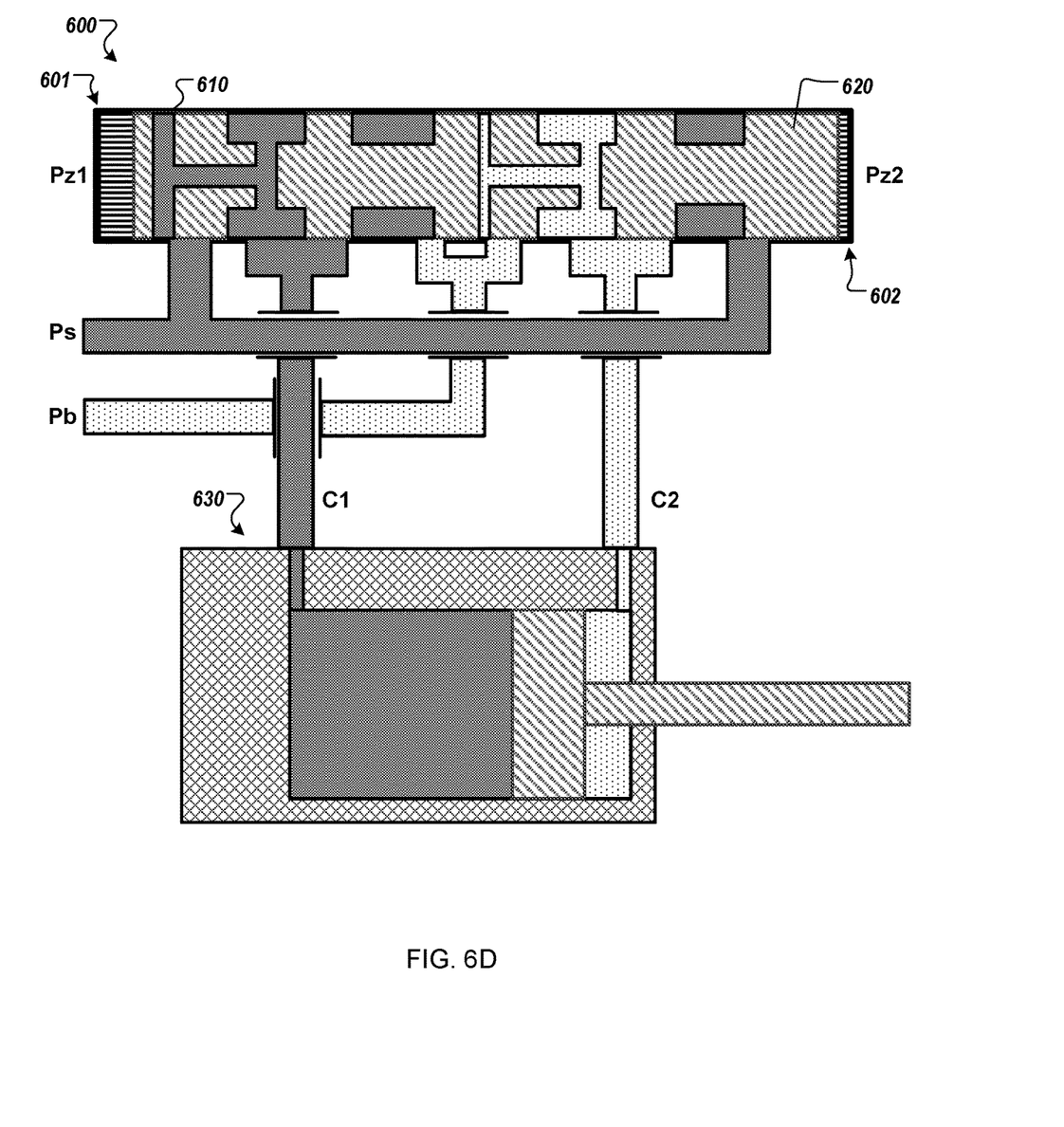

FIG. 6D shows the assembly 600 in a fourth configuration. In the illustrated example, the valve spool 620 is positioned at or near a second end 602 of the housing 610. The fourth position is configured to cause fluid to flow downstream to the effector 630 so as to cause an action that is the same as, or similar to, the first position (e.g., in the illustrated example, extension of the effector 630). In some implementations, the configuration shown in FIG. 6D can be a representation of the example valve 400 of FIG. 4, configured in the third position 430.

Figure 7:
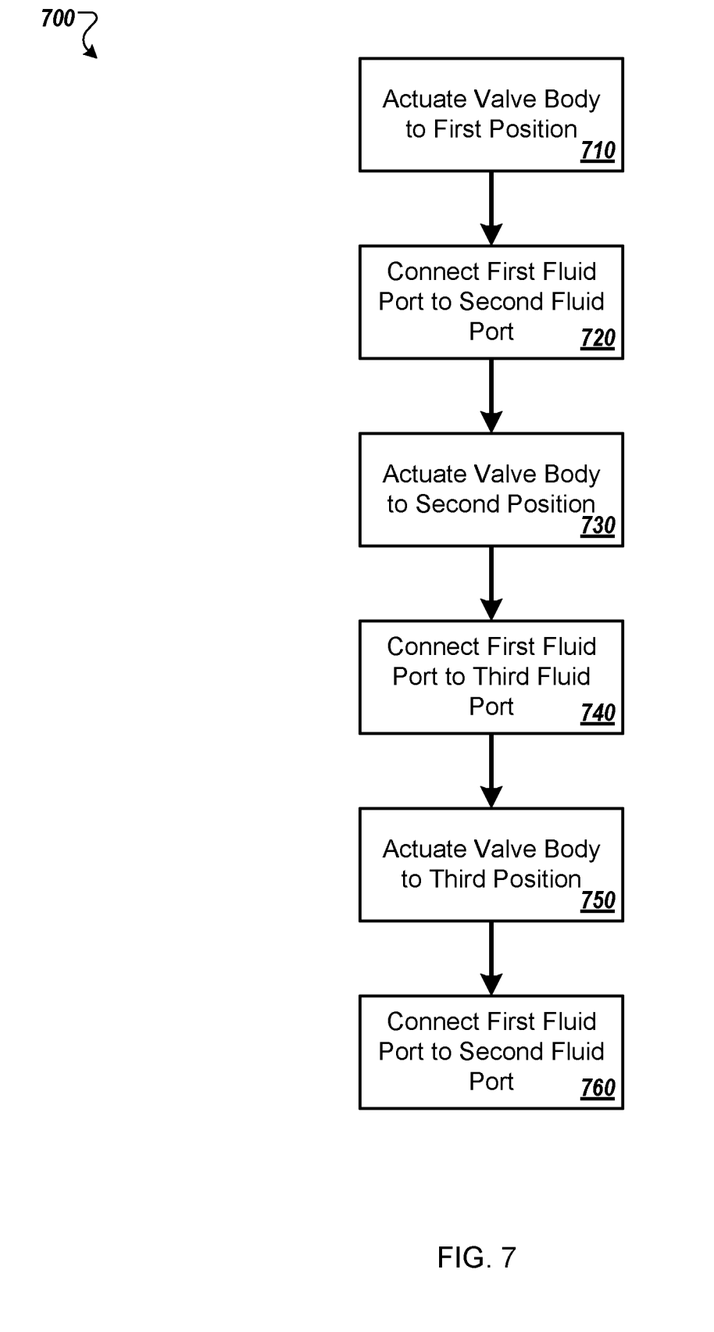
FIG. 7 is a flow diagram of an example process for failsafe electro-hydraulic servo valve control.

FIG. 7 is a flow diagram of an example process 700 for failsafe electro-hydraulic servo valve control. In some implementations, the process 700 can be used with the example failsafe servo valves 200, 300, 400, and 600, and the example actuator 500 of FIGS. 2-6D.

At 710, a valve body of a servo valve is actuated to a first position. For example, the assembly 600 can be actuated to the configuration shown in FIG. 6A, or the example position 410 of FIG. 4.

At 720, a first fluid port is fluidly connected to a second fluid port based on the first valve position. For example, in the configuration shown in FIG. 4, the inlet 401 is connected to Ps in the position 410.

At 730, the valve body is actuated to a second position away from the first position. For example, the assembly 600 can be actuated to the configuration shown in FIG. 6C, or the position 420 of FIG. 4.

At 740, a third fluid port is fluidly connected to the first fluid port based on the second valve position. For example, in the configuration shown in FIG. 4, the inlet 401 is connected to Pb in the position 420.

In some implementations, the process 700 can also include flowing a first fluid flow through the second port, actuating a fluid actuator in a first direction based the first fluid flow, flowing a second fluid flow through the third port, and actuating the fluid actuator in a second direction, opposite the first direction, based the second fluid flow. For example, the piston assembly 520 of the two-stage EHSV 518 is configured to provide flow to actuate the effector 550 in a first direction, and provide a different flow to actuate the effector 550 in the opposite direction. In another example, the assembly 600 is configured to retract the effector 630 in the configuration shown in FIG. 6C, and extend the effector in the configurations shown in FIGS. 6A and 6D At 750, the valve body is actuated to a third position away from the second position opposite the first position. For example, the assembly 600 can be actuated to the configuration shown in FIG. 6D, or the position 430 of FIG. 4.

At 760, the first fluid port is fluidly connected to the second fluid port based on the third valve position. For example, in the configuration shown in FIG. 4, the inlet 401 is connected to Ps in the position 430.

In some implementations, the process 700 can also include actuating the valve body to a fourth position away from the first position, the second position, and the third position, and preventing, by the valve body in the fourth position, fluid flow among the first fluid port, the second fluid port, and the third fluid port. For example, the assembly 600 can be actuated to the configuration shown in FIG. 6B (e.g., a null position).

In some implementations, actuating the valve body to the first position can also include actuating an electrohydraulic valve configured to urge the valve body to the first position, and actuating the valve body to the second position can also include actuating the electrohydraulic valve, wherein the electrohydraulic valve is further configured to urge the valve body to the second position. For example, the electrical actuator 512 is configured to actuate in response to an electrical current and controllably and alternatingly permit fluid flow through one of a nozzle 514a or a nozzle 514b, and block fluid flow through the other of the nozzles 514a-514b to actuate movement of the failsafe servo valve piston assembly 520.

In some implementations, the electrohydraulic valve can be configured to position the valve body into the first position and the second position under nominal operational conditions. For example, the first stage 510 may be configured to position the piston assembly 520 into the configurations shown in FIGS. 6A and 6C under normal conditions. During a malfunction in which the valve spool 620 is driven to either the leftmost or the rightmost hard stop, which corresponds to the configuration shown in FIG. 6A or the configuration shown in FIG. 6D, which causes the effector 550 to be driven in the same direction as the configuration shown in FIG. 6A.

In some embodiments, the servo valve can be a linear valve configured to move between the first position, the second position, and the third position. For example, the example failsafe servo valves 200, 300, 400, 520, and 600 are illustrated and described as being linear valves.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of actuating a fluid valve assembly of a fluid actuator system, the method comprising:
   actuating, based on a first electrical current, an armature of a torque motor of a first stage of a two-stage electrohydraulic servo valve to a first armature configuration;
   flowing, by the first stage in the first armature configuration, a fluid to a first end of a piston assembly of a second stage of the two-stage electrohydraulic servo valve, wherein the piston assembly comprises a valve body;
   actuating, by the fluid at the first end, the valve body to a first position;
   fluidly connecting, by the valve body, a first fluid port to a second fluid port based on the first position;
   flowing a fluid flow from the first fluid port through the second fluid port to a first fluid chamber of a fluid actuator;
   actuating, based on fluid pressure in the first fluid chamber, the fluid actuator in a first direction;
   actuating, based on a second electrical current, the armature to a second armature configuration;
   flowing, by the first stage in the second armature configuration, a fluid to a second end of the piston assembly;
   actuating, by the fluid at the second end, the valve body to a second position away from the first position;
   fluidly connecting, by the valve body, a third fluid port to the first fluid port based on the second position;
   flowing the fluid flow from the first fluid port through the third fluid port to a second fluid chamber of the fluid actuator;
   actuating, based on fluid pressure in the second fluid chamber, the fluid actuator in a second direction opposite the first direction;
   actuating, by a bias member configured to urge the valve body toward the first position, the valve body toward the first position;
   fluidly connecting, by the valve body, the first fluid port to the second fluid port;
   actuating the valve body to a third position away from the first position, wherein the second position is between the third position and the first position;
   fluidly connecting, by the valve body, the first fluid port to the second fluid port based on the third position;
   flowing the fluid flow from the first fluid port through the second fluid port to the first fluid chamber;
   actuating, based on fluid pressure in the first fluid chamber, the fluid actuator in the first direction;
   actuating the valve body to a fourth position configured as an intermediary position between the first position and the second position, wherein the second position is configured as an intermediary position between the fourth position and the third position; and
   preventing, by the valve body in the fourth position, the fluid flow among the first fluid port, the second fluid port, and the third fluid port.

2. The method of claim 1, wherein the two-stage electrohydraulic servo valve is configured to position the valve body into the first position and the second position under nominal operational conditions.

3. The method of claim 1, wherein the valve body is a linear valve body configured to move linearly, and the first position, the second position, and the third position are linear positions of the linear valve body.

* * * * *